Dec. 21, 1965 C. J. PETERS 3,224,074

METHOD OF MAKING A MAGNETIC RECORDING HEAD STRUCTURE

Original Filed June 24, 1960

INVENTOR
CHARLES J. PETERS
BY
Spencer E. Olson
ATTORNEY 3,224,074
Patented Dec. 21, 1965

3,224,074

METHOD OF MAKING A MAGNETIC RECORDING HEAD STRUCTURE

Charles J. Peters, Wayland, Mass., assignor to Sylvania Electric Products Inc., a corporation of Delaware Original application June 24, 1960, Ser. No. 38,613. Divided and this application Aug. 7, 1963, Ser. No. 303,712
5 Claims. (Cl. 29—155.5)

This application is a division of application S.N. 38,-613 filed June 24, 1960, now abandoned.

This invention relates to magnetic recording, and more particularly to improved magnetic recording head structures and a method for fabricating the same.

In essence, magnetic sound recording heads heretofore used in sound recording and sound reproduction consisted of a two piece magnetic core and a signal coil wound on the core. The electric oscillations flowing through the coil generate an alternating magnetic field across an air gap between confronting pole pieces on either side of a slit provided in the magnetic core, a portion of the magnetic flux passing through the tape to impress a permanent magnetic record on the tape. Usually the core is in the form of a toroid and the slit is filled with a suitable non-magnetic material. To obtain good recording and playback frequency response from transducers of this type, the gap necessarily has a width of between 6 and 12 microns. To achieve the requisite tolerances on a gap this narrow usually requires that the confronting faces of the pole pieces defining the gap be carefully ground and polished, a painstaking and expensive operation.

Besides being difficult and expensive to fabricate, recording heads of this structure have inherent inefficiencies and limitations. More specifically, only the fringing field across the confronting pole pieces of the core passes through the recording medium and contributes to recording and playback; that is, the lines of flux extending directly across the gap within the confines of the confronting areas of the pole pieces serve no useful purpose. In fact, the magnetic field which passes directly from one pole to the other has a deleterious effect during both the recording and reproduce operation. This flux increases the inductance of the signal coil so that more drive voltage is required to establish the proper recording current. During the reproduce operation, when the permanent magnetism of the tape establishes a magnetic flux in the core, only part of this flux threads the signal coil and is effective in producing an output voltage. The remaining part of the flux passes directly from pole piece to pole piece without threading the signal coil.

It is, accordingly, an object of the present invention to provide an improved magnetic recording head of simple, low cost construction.

Another object of the invention is to provide a magnetic transducer having a narrow recording gap which can be achieved without expansive machining and grinding methods.

Still another object of the invention is to provide a magnetic transducer which produces essentially only a useful fringing magnetic field thereby to minimize the effect of the low reluctance path extending directly from pole piece to pole piece.

Another object of the invention is to provide an improved method for the fabrication of magnetic transducers.

These objects are attained, in accordance with one feature of the invention by providing a magnetic core of very small cross-sectional area. To this end, the core consists of a thin film of magnetic material, for example an iron-nickel alloy, evaporated or otherwise deposited to the outer surface of a cylindrical support member formed of non-magnetic material, such as glass. A short section of glass tubing is satisfactory as a support member. A recording gap is formed in the core by scribing a fine line in the film parallel to the axis of the cylinder. Using techniques to be described it is possible to form a line about one micron wide with smooth edges to thereby provide a narrow effective air gap width without resorting to the grinding and polishing operation required in prior art recording heads. The head is completed by winding a signal coil on the cylinder, longitudinally thereof, for magnetic linkage with the film of magnetic material.

In addition to recording applications requiring a single recording head for laying down a single record track, there are many instances when it is desirable to have a magnetic transducer unit which is capable of recording information, without mutual interference, on several closely spaced, parallel record tracks. One example of apparatus where such transducer units are desirable is a computer system wherein data is stored in analogue or digital form as permanently magnetized regions of varying intensity on a magnetic record member. In such apparatus, it is important that the signal translating gaps of the several head elements be accurately positioned with respect to each other and with the gaps of the heads transversely aligned. In order to permit interchangeability of tapes between machines, the air gaps are preferably aligned to within ±1.25 microns. This mechanical precision is required in many applications because significance is attached to the simultaneity of occurrence of pulses in several channels. To obtain the desired simultaneity throughout the entire record-reproduce process it is desirable that the heads be mechanically and electrically identical. It has been impossible to make a group of heads electrically identical. This dissimilarity probably arises from the unique history of mechanical stress and temperature cycling of the magnetic material. To obtain the desired performance it has been necessary to insert electrical compensation networks in each channel amplifier. In accordance with the present invention, the magnetic component for all the tracks is made at one time, thus reducing the need for electrical alignment of the heads.

To maximize recording density, that is, to lay down a maximum number of record tracks on a tape of given width, adjacent heads are desirably placed as close to each other as possible. However, because of the thickness of the toroid of available recording heads there is an appreciable magnetic field at the sides of the air gap which causes coupling between adjacent heads unless precautions are taken to isolate one from the other. Heretofore, elimination of this cross talk has been achieved by shielding, or by undesirably wide spacings between the heads.

Accordingly, another object of this invention is to provide a new and improved multiple-head transducer assembly.

Another object is to provide a multiple-head transducer having accurately aligned gaps which are closely spaced transversely of the record medium.

These objects are attained according to the invention by applying a plurality of spaced strips of magnetic material circumferentially around a supporting cylinder, each constituting a separate core. Accurate alignment of the recording gaps of the several cores is achieved by scribing a straight thin line across all of the strips along a direction parallel to the longitudinal axis of the cylinder. The strips can be very accurately aligned by masking the area between them during evaporation of the magnetic film on the cylinder. A separate coil is provided for each core, being wound through openings in the wall of the cylinder positioned between the strips. Because the magnetic film is very thin, there is very little stray magnetic field at the sides of the recording gaps thereby permitting close spacing of the strips without the requirement for complex shielding means between adjacent elements.

Other objects, features and advantages of the invention will become apparent from the following description, taken in conjunction with the accompanying drawings, in which.

Figure 2:
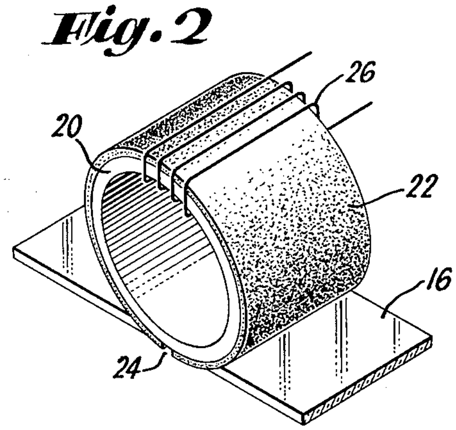
FIG. 2 is a perspective view of a single transducer head according to the invention.
Figures 2A, 3, 4:
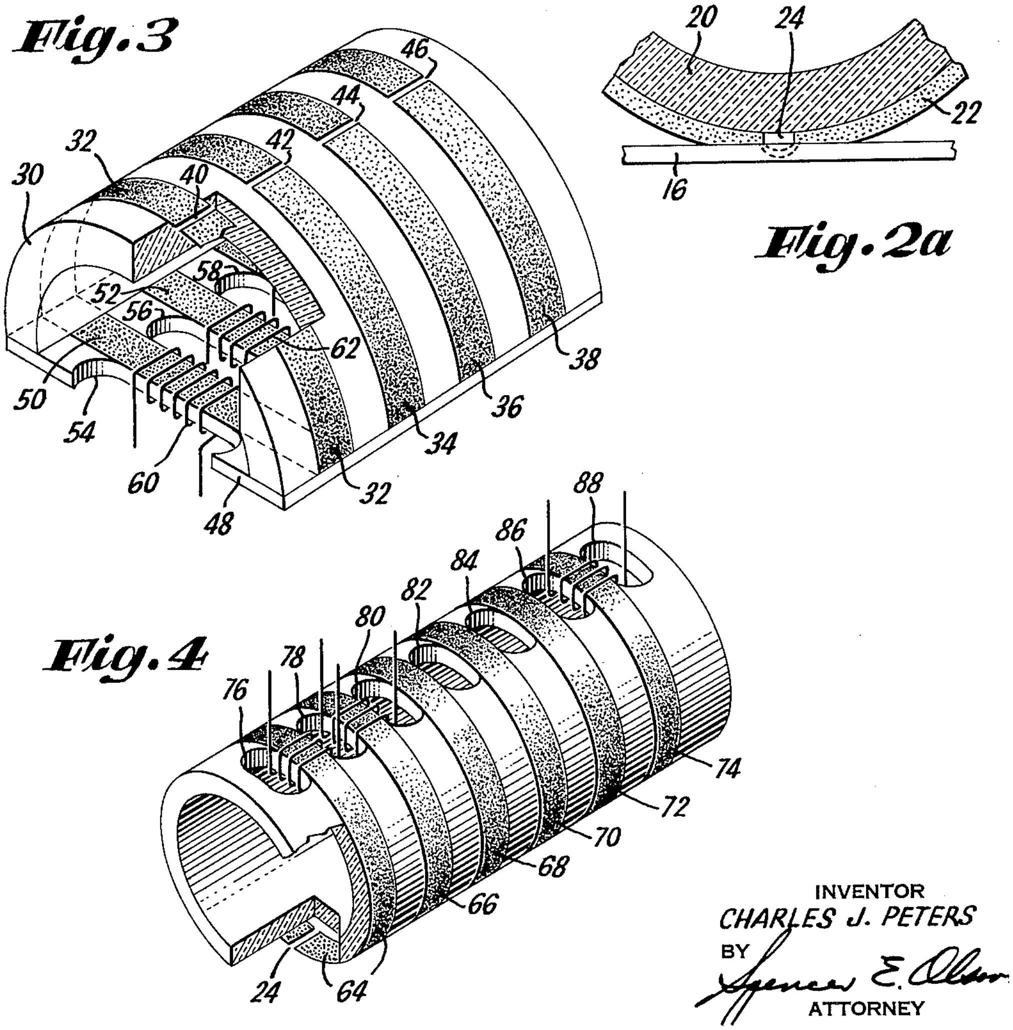

FIG. 2*a* is an enlarged view of a fragmentary portion of the structure of FIG. 2;

FIG. 3 is a perspective view of a multiple-head transducer embodying the invention; and FIG. 4 is a perspective view of an alternate form of a multiple head transducer.

Figure 1:
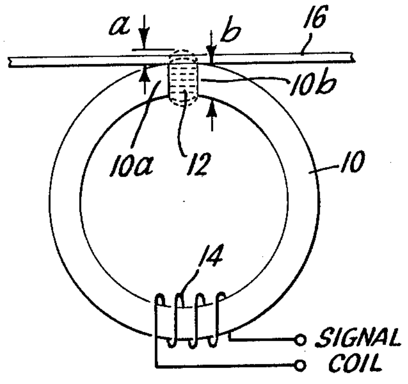
FIG. 1 is a schematic diagram of a typical prior art transducer.

Referring now to FIG. 1, conventional recording heads consist essentially of a two piece toroid 10 formed of magnetic material having a narrow gap 12 between confronting pole pieces 10*a* and 10*b*. When a signal to be recorded is applied to a signal coil 14 wound on the toroid, a magnetic field is produced in the magnetic member which field extends across the gap. Recording takes place on a magnetizable member 16, such as a tape, by the fringing field which occurs at the air gap and extends into the tape. That is, only that portion of the field which exists radially of the perimeter of the toroid, in the region designated "*a*," is effective in the recording (or playback) process. The magnetic field which passes directly between the confronting poles serves no useful purpose. Indeed, this flux has the deleterious effect of increasing the inductance of the signal coil, and because of the thickness dimension *b* of the toroid, an appreciable magnetic field exists at the sides of the air gap; i.e., in a direction perpendicular to the plane of the drawing.

In accordance with the present invention, the thickness of the magnetic material is minimized to reduce the field at the sides of the gap, and to minimize the flux which does not contribute to the recording and playback process. To this end, referring to FIGS. 2 and 2*a*, the transducer according to this invention comprises a hollow, cylindrical support member 20 of a length generally corresponding to the width of the tape 16 with which it is to be used. The cylinder 20 may be of circular cross-section as shown, of semi-circular cross-section as will be described in connection with FIG. 3, or other shapes as may be dictated by a particular installation. The cylinder 20 is formed of dielectric material, a short section of glass tubing being eminently satisfactory. The magnetic core of the transducer consists of a thin film of magnetic material 22 applied to the outer surface of the cylinder, as by vacuum deposition techniques. The entire outer surface of the cylinder is initially coated, a film having a range of thicknesses from 10 to 50 microns being satisfactory for the usual recording application. The film may be of uniform thickness throughout the circumference of the cylinder, but in order to minimize the width of the gap it may be preferable to apply a thinner film, about 10 to 25 microns thick, in the region where the gap is to be scribed, with the balance of the surface coated with a thicker film, from 50 to 75 microns, to enhance the permeance of the magnetic circuit. This build up may be achieved by electroplating. Alloys of iron and nickel, with high nickel content to achieve the necessary high initial permeability, are suitable materials for the film 22, and are readily deposited by known evaporation techniques. It has been observed, however, that lines sufficiently thin to provide a sufficiently narrow air gap are difficult to scribe on a film of high nickel content because of poor adherence to the glass substrate, but that extremely thin lines can be scribed in iron-nickel films high in iron content. Applicant has discovered that by depositing a very thin layer, of the order of 0.1 to 1 micron, of high iron content material, and thereafter evaporating a high nickel content material to the desired thickness, a thin line, with satisfactorily smooth edges, can be scribed in the film.

An air gap 24 is formed in the magnetic film by scribing a line therein parallel to the longitudinal axis of the supporting cylinder. The line is conveniently scribed by first coating the magnetic film with a thin layer of wax, and then drawing a thin line in the wax with a diamond tipped scribe, to expose the magnetic film, at the desired location of the gap. The exposed magnetic film is then removed with a suitable etchant, such as ferric chloride. Upon removal of the wax, a narrow gap, of width approximately equal to the thickness of the film, is provided. Depending upon the application, the proper width of the gap is between 3 to 50 microns (⅛ to 2 mils). The narrow gaps are applicable to the play-back from tape which bears on the head, whereas the wider gaps are suitable for the recording operation on tape and for record-reproduce on magnetic drums and the like where the head is displaced from the record medium. There are two ways in which the narrow gaps may be made. One is to make the material in the immediate vicinity of the gap equal in thickness to the scored gap width. The scribing and etching operation can then be performed as previously described. To provide good magnetic coupling with the signal coil, the magnetic film, except in the immediate vicinity of the gap should be augmented, as by electroplating with additional magnetic material. A total thickness of 75 microns is sufficient. An alternate method is to deposit a magnetic layer somewhat thicker than the desired gap width and then scribe the gap. At this stage the resulting gap will be wider than desired. Additional magnetic material is then deposited by electroplating. Because of the higher current density at the edges of the gap, this electroplating deposit will tend to narrow the gap. By proper choice of the thickness of the first and second deposit, the desired width of gap and thickness of material can be obtained. Because of the very small thickness of the film at the sides of the gap, very little flux goes directly from one "pole-face" to the other, a significant portion of the total flux being in the form of a fringing field which enters the tape 16 to be effective in recording and play-back. The magnetic field is produced across the gap by a signal coil 26 longitudinally wound on the cylinder in magnetic linkage with the film strip 22.

In a transducer which has been satisfactorily operated, the support 20 consists of a one-quarter inch long section of three-sixteenths inch diameter glass having a magnetic film thickness of 24 microns in the region of the gap 24, and a thickness of 50 microns on the remaining portions of a surface.

The techniques just described for the fabrication of a single element transducer are readily applicable to a multi-element transducer head. As shown in FIG. 3, the support for such a unit may be in the form of a semi-circular cylinder 30, preferably formed of glass, of a length equal to or somewhat greater than the width of the tape on which multiple track records are to be laid down. In the illustrated four-track transducer, four thin strips or bands 32, 34, 36 and 38 are applied to the outer curved surface of the support and extend around the cylinder. The strips are applied by evaporation deposition, and electroplating, the uncoated spaces between adjacent strips being obtained by masking. The strips extend inwardly along the diametral surfaces of the cylinder. Each of the strips has a respective recording gap 40, 42, 44, and 46 formed therein, preferably by scribing and etching method as described earlier in connection with FIG. 2. By drawing the thin line in the wax along a straight edge placed parallel to the longitudinal axis of the support member 30, the gaps may be very accurately aligned in the direction transversely of the tape. Similarly, by known masking techniques, the spacing between the strips can be very accurately controlled.

The magnetic core of each of the transducer elements is completed by a corresponding number of strips of magnetic film supported on one surface of a flat support member 48 joined to the support 30 along its diameter, two of such strips being shown in FIG. 3 at 50 and 52. These strips are of the same width as strips 32 through 38, and spaced apart a like distance, so as to engage the in-turned ends of the strips to close the magnetic loop. The flat support member 48, also preferably formed of glass, is provided with cutouts 54, 56, 58, etc., between successive strips to permit the winding of separate signal coils 60 and 62 about the coated portions of the support. Thus, each signal coil is magnetically coupled to a respective one of the "bands" of magnetic material for producing a magnetic flux across its corresponding air gap. It will be noted that the axis of the signal coil is parallel to the strip on which it is wound, and parallel to each other, with the consequence that the major portion of the magnetic field produced by each is parallel to the strip; that is, very little flux is produced externally of the signal coil to the sides thereof to cause mutual coupling between signal coils. Consequently, the problem of cross-talk is relatively minor, and such shielding as may be necessary can readily be inserted between adjacent coils, for example, in the openings 56 and 58.

Although the structure of FIG. 3 is preferred by reason of ease of fabrication, particularly with respect to the winding of the signal coils thereon, the invention is not limited to this form but may be of circular cross-section as shown in FIG. 4 with magnetic strips 64, 66, 68, 70, 72 and 74 (for a six-track head) extending around the circumference of the cylinder. Slots or openings 76 through 88 are formed in the wall of the cylinder, between the magnetic strips, for receiving separate signal coils for the several magnetic paths. As in the structure of FIG. 3, the axes of the signal coils are essentially parallel to each other, thus minimizing cross coupling between adjacent coils. Diametrically opposite from the signal coils each of the strips is provided with an air gap 24, in the manner described earlier.

From the foregoing it is seen that there has been provided an improved transducing head of simple construction, adaptable to single or multi-track magnetic recording, which is characterized by accuracy in the width of the air gap, and accuracy of alignment and spacing of the gaps, and minimization of inter-channel signal linkage, in the multi-head unit.

While the invention has been described in connection with magnetic tape, it is apparent that the transducer is equally applicable, with suitable modifications, to magnetic drums and the like, as well. Likewise, it will be apparent to those skilled in the art that the support for the strips of magnetic material need not be of the cross-sectional shapes described, but might take other configurations. Similarly, although the support for the film of magnetic material has been illustrated as being formed of glass or other dielectric material, in some applications it may be desirable to employ a support formed of stainless steel, brass, or other non-magnetic material. Other parts of the above-described transducer can also obviously be altered by those skilled in the art without departing from the spirit and teachings of the invention.

What is claimed is:

1. A method of making a magnetic transducer head having a core of magnetic material with a gap therein supported on a non-magnetic supporting member and having a winding around the core, which comprises the steps of: depositing a thin film loop of magnetic material on a support member formed of non-magnetic material, coating said film with an etchant-resistant material, removing a strip of said etchant-resistant material to expose an area of said film having the desired location and dimensions of said gap, subjecting said exposed area to an etchant which attacks the material of said film but does not attack said non-magnetic and said etchant-resistant materials to remove the magnetic material in said exposed area down to the supporting member to form a gap in said loop, removing the etchant-resistant material, and placing a winding around the core.

2. A method of making a magnetic transducer head having a core of magnetic material with a gap therein supported on a non-magnetic supporting member and having a winding around the core, which comprises the steps of: depositing by evaporation a thin film loop of an alloy of iron and nickel on a support member formed of non-magnetic material, coating said film with an etchant-resistant material, scribing a line in said etchant-resistant material to expose an area of said film having the desired location and dimensions of said gap, subjecting said exposed area to an etchant which attacks said alloy of iron and nickel but does not attack said etchant-resistant material nor said non-magnetic material to remove said film in said exposed area down to said supporting member to form a gap in said loop, removing the etchant-resistant material, and placing a winding around the core.

3. A method of making a multiple-head magnetic transducer having a plurality of cores, each with a gap therein, supported on a non-magnetic supporting member and having a winding around each of the cores, which comprises the steps of: depositing a plurality of spaced apart thin film loops of magnetic material on a common support member formed of non-magnetic material, coating the film of all of said loops with an etchant-resistant material, scribing a straight line in said etchant-resistant material across all of said loops in a direction transversely of said loops to expose an area of film in each of said loops having the desired location and dimensions of its respective gap, subjecting said exposed areas to an etchant which attacks the material of said film but does not attack said etchant-resistant material nor said non-magnetic material to remove said film in said exposed areas down to said supporting member to form aligned gaps in said plurality of loops, removing the etchant-resistant material, and placing a winding around each of said loops.

4. A method of making a multiple-head magnetic transducer having a plurality of cores, each with a gap therein, supported on a common supporting member and having a winding around each of the cores, which comprises the steps of: depositing a plurality of parallel, spaced apart, thin film loops of magnetic material circumferentially around a common cylindrical support member formed of non-magnetic material, coating the film of said loops with an etchant-resistant material, scribing a straight line in said etchant-resistant material across all of said loops in a direction parallel to the axis of said support member to expose an area of film in each of said loops of a width substantially equal to the desired width of its respective gap, subjecting said exposed areas to an etchant which attacks the material of said film but does not attack said etchant-resistant material nor said non-magnetic material to remove said film in said exposed areas down to said supporting member to form aligned gaps in said loops, removing the etchant-resistant material, and placing a winding around each of said loops.

5. Method according to claim 4 wherein said magnetic material is an alloy of iron and nickel, said supporting member is formed of glass, said etchant-resistant material is wax, and said etchant is ferric chloride.

References Cited by the Examiner

UNITED STATES PATENTS

| | | | |
|---|---|---|---|
| 2,877,540 | 3/1959 | Austen ------------ | 29—155.5 |
| 3,000,078 | 9/1961 | Emenaker et al. ---- | 29—155.5 |
| 3,106,617 | 10/1963 | Fox. | |
| 3,120,001 | 1/1964 | Supernowicz. | |

WHITMORE A. WILTZ, *Primary Examiner.*

JOHN F. CAMPBELL, *Examiner.*